Nov. 21, 1967   A. N. SAIMANOV ET AL   3,353,276
WAVINESS TESTER FOR CYLINDRICAL SURFACES OF PARTS
SUCH AS BEARING FACE GROOVES
Filed July 13, 1966   2 Sheets-Sheet 2

United States Patent Office 3,353,276
Patented Nov. 21, 1967

3,353,276
WAVINESS TESTER FOR CYLINDRICAL SURFACES OF PARTS SUCH AS BEARING FACE GROOVES
Anatoly Nicolaevich Saimanov, Gazonnaia Ulitsa 30, Apt. 1, and Vasily Fedorovich Sovkin, Ulianovskaia Ulitsa 19, Apt. 23, both of Kuibyshev, U.S.S.R.
Filed July 13, 1966, Ser. No. 564,920
3 Claims. (Cl. 33—174)

ABSTRACT OF THE DISCLOSURE

An instrument for determining the waviness of grooves of ball bearing rings in which a base carries means for fixing and rotating the ring and a measuring head freely mounted on the groove to be checked. The measuring head includes a plurality of spring-loaded supporting members secured to a bracket and which are in contact with the groove with one of the supporting members having freely associated therewith a feeler permanently in contact with the groove and operably connected to a pickup attached to the bracket. The geometrical axes of the supporting members and feeler are disposed in one plane and means mounted on the base coaxially with the feeler prevents the head from turning during rotation of the ring.

---

This application is a continuation-in-part of our copending application Ser. No. 334,125, filed Dec. 30, 1963, and now abandoned.

The present invention relates to instruments for checking the quality of machined surfaces of parts, and more particularly to instruments for determining the waviness of the cylindrical surfaces of the parts, preferably of grooves of ball bearing rings.

The known prior art instruments for determining the waviness of grooves of ball bearing rings comprise a means for fixing and rotating the part to be checked, and a measuring head provided with a feeler connected to a pickup.

In some existing instruments, the measuring head is rigidly fixed on the instrument base, while in other instruments the head is movable, but only in the radial plane of the part to be checked.

This design of these instruments accounts for the fact that their readings comprise not only the defects in machining the part surface to be checked, but also the defects in machining the whole part, and the defects likely to arise during the fixing thereof. These instruments require, therefore, that the part to be checked should be precisely oriented in relation to the measuring head, while this orientation, in turn, requires a high accuracy in manufacturing the part to be checked (as to the geometrical proportions thereof) and a high quality of the surfaces to be conjugated when fixing the part to be checked and component elements of the instrument.

Accordingly, an object of the present invention is to eliminate the above-mentioned disadvantages existing in the art.

Another object of the present invention is to provide an instrument for determining the waviness of cylindrical surfaces of parts whose readings are characteristic of the defects in machining only the surface to be checked of a part.

A further object of the present invention is to provide an instrument of such a type, which is simple to manufacture, convenient in servicing, and reliable in operation.

Other objects and advantages of the present invention will become more fully apparent from a consideration of the following description, taken in conjunction with the accompanying drawings, in which.

Figure 1:
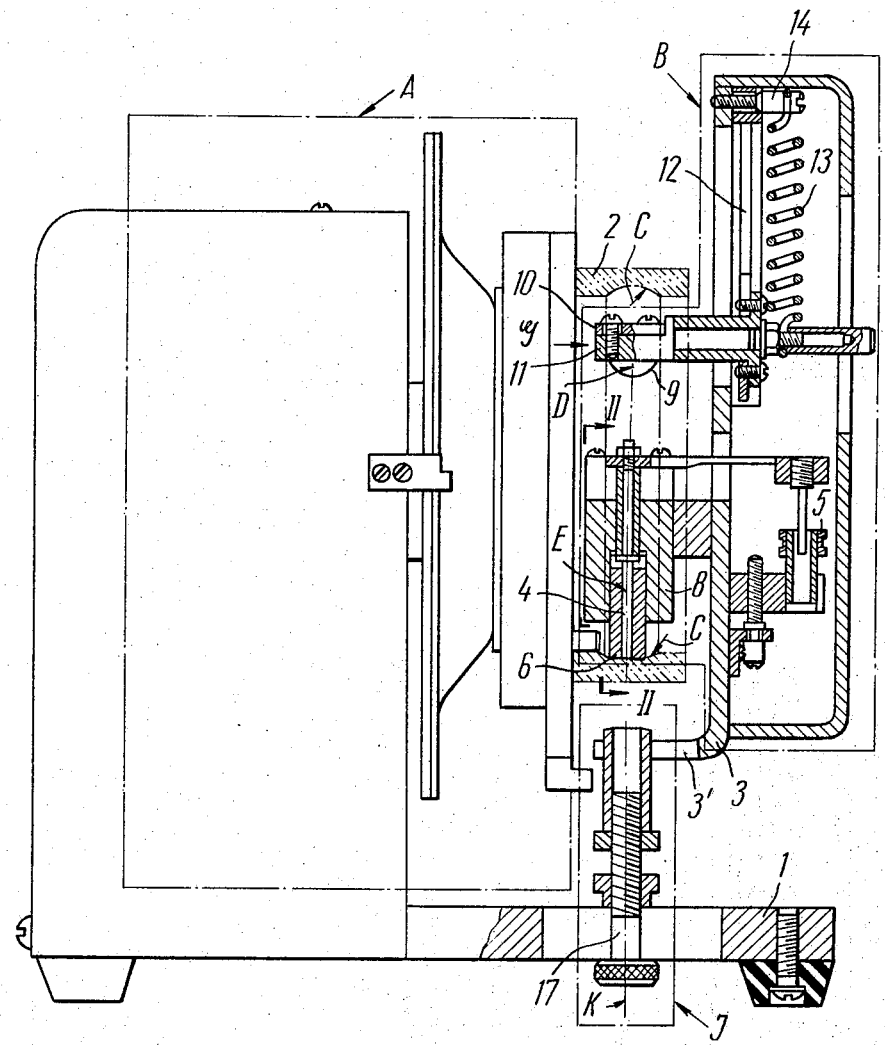
FIG. 1 is a view partly in elevation and partly in cross-section of an instrument for determining the waviness of the internal groove of a ball bearing ring.

The instrument has a base 1 on which is fixed a means A for securing and rotating a part 2 to be checked. Any means, known to those skilled in the art, may be used to fix the part 2 to be checked and to cause it to rotate. The means A is not shown in detail in FIG. 1 so as to enable a better illustration of essential elements of the invention.

A measuring head B comprises a bracket 3 intended to have fixed thereon spring-loaded supporting members which are in contact with surface C of the part 2 which is to be checked. One of the supporting members is a base supporting element, in which there is freely mounted a feeler 4 connected to a pickup 5.

The bracket 3 is essentially a metal strip having the shape of the mirror image of an L-shaped form, and the lower portion thereof is provided with a slot 3'.

The base supporting element is a changeable part defined by a segment 6 (FIG. 2) or a disk rigidly secured on the bracket 3. The radius of curvature A of the segment 6 corresponds to the radius of curvature of the surface C being checked (FIG. 1).

Figure 2:
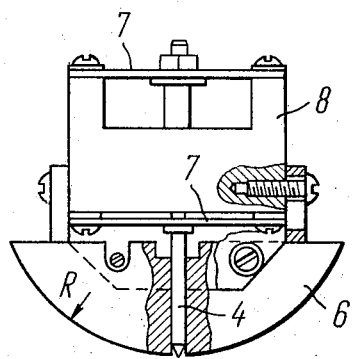
FIG. 2 is a view taken along the line II—II of FIG. 1.

The feeler 4 (FIGS. 1 and 2) is loaded with a flat spring 7 (FIG. 2) fixed on a block 8 connected to the segment 6, and is in permanent contact with the surface C to be checked (FIG. 1).

Figure 3:
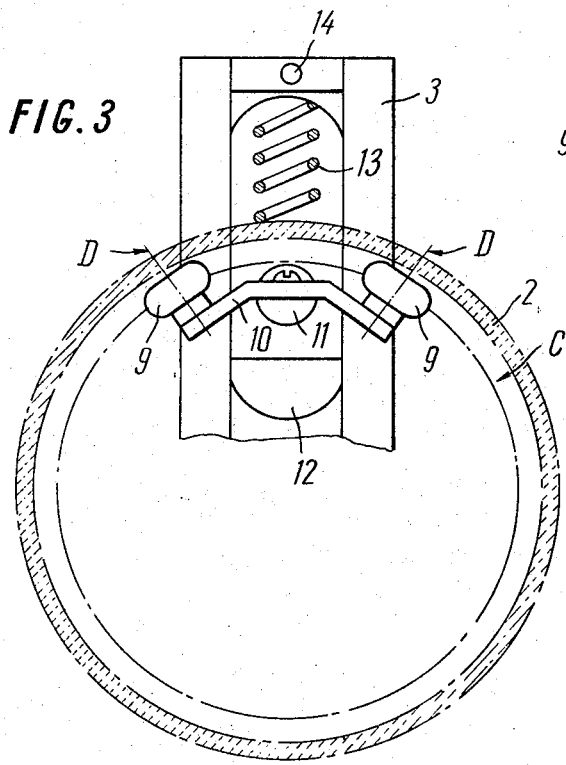
FIG. 3 is a view showing the arrangement of the supporting members of the present invention with the view looking in the direction of the arrow G in FIG. 1.

Two other supporting members 9 (FIGS. 1 and 3) of the measuring head B are disposed at the ends respective of a two-arm lever 10 provided with an oscillating axle 11. The axle 11 is caused to move along a groove 12 of the bracket 3 under the action of a spring 13 fixed by a screw 14 on the bracket 3 to which is rigidly connected the segment 6 constituting essentially the base supporting element of the measuring head.

The geometrical axes D and E (FIG. 1) of the supporting members 6 and 9, and feeler 4, respectively, are disposed in one plane. Such an arrangement and fixing of the supporting members of the measuring head B provide for their reliable engagement with the surface C of the part.

Figure 4:
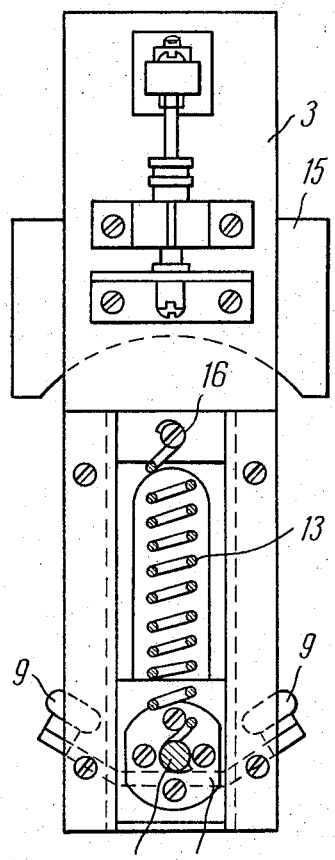

The measuring head may be employed for determining the waviness of both internal grooves (head B in FIGS. 1, 2 and 3) of ball bearing rings and external grooves (FIG. 4).

The measuring head for determining the waviness of external grooves of the ball bearing rings does not differ essentially from the measuring head B. For example, a base supporting member 15 (FIG. 4) which has a different shape is fixed in the same manner as the segment 6 of the measuring head B (FIG. 1) on the bracket 3. Other supporting members 9 are also disposed at the ends of the two-arm lever 10 together with the spring 13 acting upon its oscillating axle 11 and is secured on the bracket 3 by means of a screw 16.

Hence, due to the spring-loaded supporting members engaging with the surface C to be checked, the measuring head is freely mounted on the surface.

The instrument is provided with a means J (FIG. 1) to restrain the measuring head B from turning when the part 2 to be checked is rotated. The means J is essentially a fixing device or pin 17 secured on the base 1 of the instrument coaxially with the feeler 4, and the fixing device enters into the slot 3' of the bracket 3.

The present invention, by mounting the measuring head B on the instrument base provides for its free displacement (during the instrument operation) in interperpendicular planes, and for its oscillation about the axis K of the fixing device 17. Hence, in this instrument is provided an autonomy of the measuring head from the means of fixing and rotating the part 2 to be checked. This enables one to determine the actual defect in machining the surface to be checked of the part, i.e. only the waviness of the surface, thus excluding other defects, such as non-accuracy in machining the part per se, and defects in the setting and fixing thereof in the instrument.

In addition, such an autonomy of the measuring head allows it to be employed for determining the waviness of the surface of the part fixed on a machine tool during the machining thereof. In such a case, the bracket 3 is prevented from rotating together with the part being checked by the aid of the fixing device, for instance, which is secured on a stationary member of the machine tool coaxially with the feeler.

The invention is not to be confined to any strict conformity to the showings in the drawings but changes or modifications may be made therein so long an such changes or modifications mark no material departure from the spirit and scope of the appended claims.

What is claimed is:

1. An instrument for determining the waviness of cylindrical surfaces of parts, particularly of grooves of ball bearing rings, comprising a base, means for fixing and rotating the part to be checked mounted on the base, a bracket, a measuring head adapted to be freely mounted on the surface to be checked, said measuring head including a plurality of supporting members secured to the bracket with said supporting members being maintained in contact with the surface to be checked, a feeler freely mounted in one of said supporting members in permanent contact with the surface to be checked, a pick-up attached to said bracket and operably connected to said feeler, and means fixedly mounted on said base coaxially with said feeler and cooperable with said bracket for restraining said measuring head from turning movement during rotation of the part.

2. The instrument for determining the waviness of cylindrical surfaces of parts as claimed in claim 1 in which said one of said supporting members is defined by a segment of a disk having a radius of curvature corresponding to the radius of curvature of the surface to be checked, a lever having two arms, the other of said supporting members each being carried by the end of an arm, an oscillating axle for said lever mounted in a groove provided in the bracket, and spring means connecting the axle to said disk segment.

3. The instrument for determining the waviness of cylindrical surfaces of parts as claimed in claim 2 in which said restraining means includes a pin secured to said base and a slot provided in said bracket for receiving said pin.

References Cited
UNITED STATES PATENTS

| 2,437,783 | 3/1948 | Hutchinson | 33—178 |
| 3,280,467 | 10/1966 | Motz et al. | 33—178 X |

FOREIGN PATENTS

| 884,111 | 7/1953 | Germany. |
| 762,361 | 11/1956 | Great Britain. |

SAMUEL S. MATTHEWS, *Primary Examiner.*

UNITED STATES PATENT OFFICE
CERTIFICATE OF CORRECTION

Patent No. 3,353,276                          November 21, 1967

Anatoly Nicolaevich Salmanov et al.

It is hereby certified that error appears in the above numbered patent requiring correction and that the said Letters Patent should read as corrected below.

In the heading to the drawings, Sheets 1 and 2, line 1, for "A. N. SAIMANOV ET AL.", each occurrence, read -- A. N. SALMANOV ET AL. --; in the heading to the printed specification, line 5, for "Anatoly Nicolaevich Saimanov" read -- Anatoly Nicolaevich Salmanov --.

Signed and sealed this 25th day of February 1969.

(SEAL)
Attest:

Edward M. Fletcher, Jr.                            EDWARD J. BRENNER
Attesting Officer                                    Commissioner of Patents